United States Patent
Gerard et al.

(10) Patent No.: US 6,988,596 B2
(45) Date of Patent: Jan. 24, 2006

(54) BRAKE CYLINDER AND MOTOR VEHICLE BRAKE COMPRISING SUCH A CYLINDER

(75) Inventors: Jean-Louis Gerard, Bagnolet (FR); Gérard Le Deit, Courtry (FR)

(73) Assignee: Robert Bosch GmbH, Stuttgart (DE)

( * ) Notice: Subject to any disclaimer, the term of this patent is extended or adjusted under 35 U.S.C. 154(b) by 8 days.

(21) Appl. No.: 10/486,596

(22) PCT Filed: Jul. 30, 2002

(86) PCT No.: PCT/FR02/02730

§ 371 (c)(1),
(2), (4) Date: Mar. 1, 2004

(87) PCT Pub. No.: WO03/014587

PCT Pub. Date: Feb. 20, 2003

(65) Prior Publication Data

US 2004/0262097 A1    Dec. 30, 2004

(30) Foreign Application Priority Data

Aug. 8, 2001   (FR) .................................. 01 10677

(51) Int. Cl.
   *F16D 55/16*       (2006.01)

(52) U.S. Cl. ................. 188/72.8; 188/72.9; 188/196 D

(58) Field of Classification Search ............... 188/72.7, 188/72.8, 72.9, 196 V, 196 D
See application file for complete search history.

(56) References Cited

U.S. PATENT DOCUMENTS

| | | | | | |
|---|---|---|---|---|---|
| 3,155,195 | A | * | 11/1964 | Brawerman | 188/71.9 |
| 3,800,920 | A | * | 4/1974 | Warwick | 188/106 F |
| 3,820,635 | A | * | 6/1974 | Hurt | 188/71.9 |
| 3,991,859 | A | * | 11/1976 | Coulter et al. | 188/71.9 |
| 4,056,173 | A | * | 11/1977 | Farr | 188/71.9 |
| 4,454,933 | A | * | 6/1984 | Hunnicutt et al. | 188/71.9 |
| 5,038,895 | A | * | 8/1991 | Evans | 188/72.7 |
| 5,219,047 | A | * | 6/1993 | Fouilleux et al. | 188/71.9 |
| 5,350,042 | A | * | 9/1994 | Thiel | 188/71.9 |
| 5,529,150 | A | * | 6/1996 | Buckley et al. | 188/72.9 |
| 6,250,438 | B1 | * | 6/2001 | Chern | 188/72.7 |
| 6,422,354 | B1 | * | 7/2002 | Shaw et al. | 188/72.8 |
| 6,659,236 | B1 | * | 12/2003 | Clark et al. | 188/79.52 |

* cited by examiner

*Primary Examiner*—Robert A. Siconolfi
(74) *Attorney, Agent, or Firm*—Leo H McCormick, Jr.; Warren Comstock

(57) ABSTRACT

A mechanically and hydraulically actuated brake cylinder for a motor vehicle having a body with a chamber for receiving an axially movable piston (4) that is connected to a pivoting shaft (11) that has a part that is located outside of the body. Pressurized fluid is presented to the chamber to hydraulically actuate a brake application while a rotational torque is applied to the shaft (11) to mechanical actuate a brake application through a ball-ramp mechanism that converts the rotational torque into translational movement for the piston. The ball-ramp mechanism is defined by a rotary plate (28) fixed to the shaft (11) with a first ramp ribs (31), second ramp ribs (32) on the piston (4) and balls (33) housed in the ramp ribs.

3 Claims, 2 Drawing Sheets

BRAKE CYLINDER AND MOTOR VEHICLE BRAKE COMPRISING SUCH A CYLINDER

Figure 1:
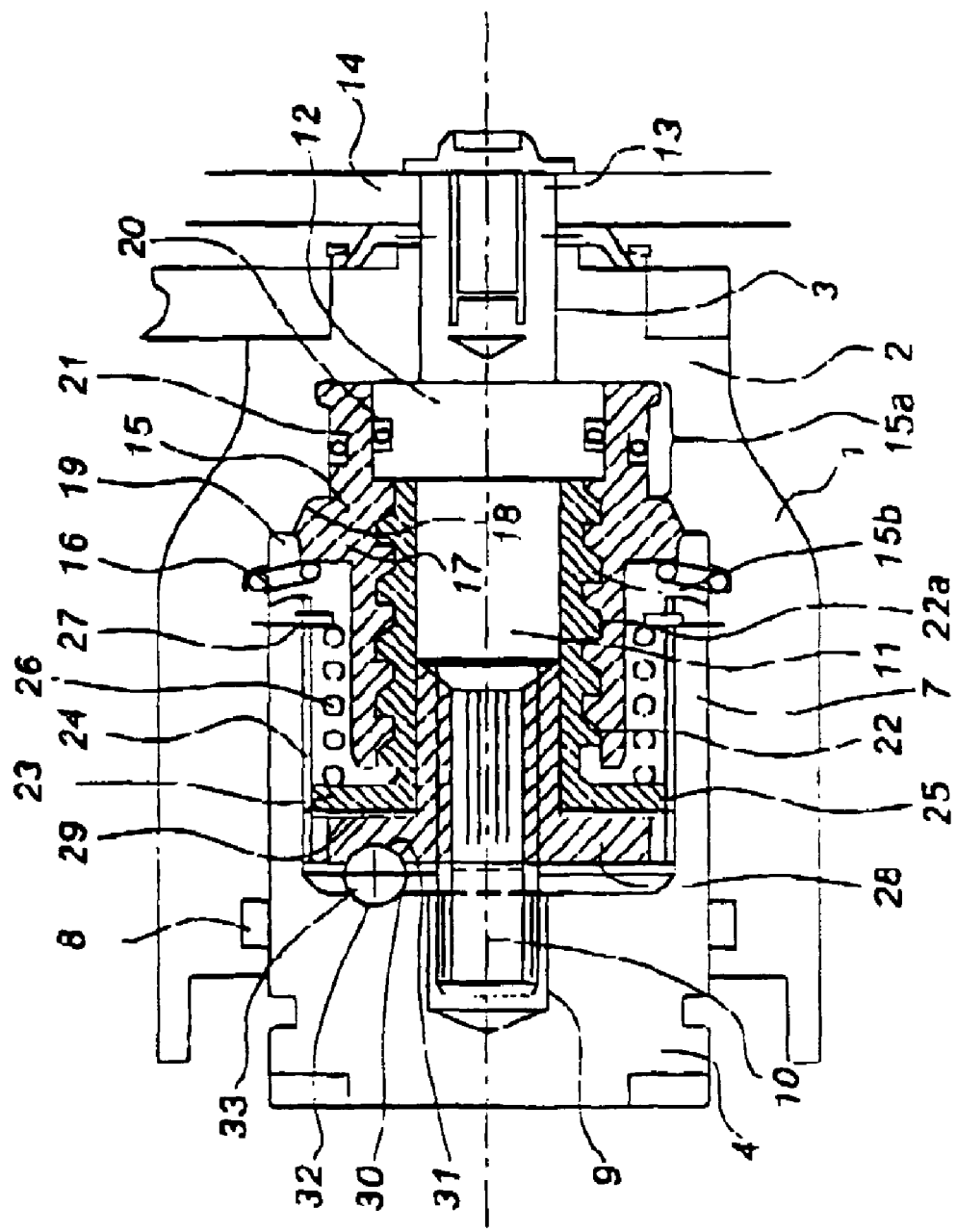

The present invention relates to a small-sized mechanically and hydraulically actuated brake cylinder and to a motor vehicle brake comprising such a cylinder.

Hydraulically and mechanically actuated brake cylinders generally comprise an axially moveable piston which pushes a friction lining carrier plate towards a brake disc, this movement being brought about either by an increase in pressure of a fluid injected into the cylinder or under the mechanical action of moving parts internal to the cylinder.

Such moving parts almost always comprise, on the one hand, a ball-ramp mechanism, the role of which is to convert a rotational movement into a translational movement and, on the other hand, a screw-nut assembly which fulfils an adjusting function and is aimed at compensating for flexing [sic] lining wear.

These internal moving parts are relatively numerous, and this has at least two consequences: on the one hand, they occupy a certain amount of space, thus limiting the possibilities of making the cylinder more compact and, on the other hand, their mounting, which is relatively complicated because of their arrangement, entails relatively expensive manual or automatic means.

The present invention sets out to propose a brake cylinder comprising a small number of parts, this reduction in the number of parts making it possible, on the one hand, to reduce the size of the cylinder and, on the other hand, to simplify its manufacture appreciably.

The subject of the present invention is a mechanically and hydraulically actuated brake cylinder for a motor vehicle, comprising an axially movable piston, a pivoting shaft of which a part, accessible from outside the cylinder, is intended to experience a rotational torque resulting from mechanical actuation of the brake, a ball-ramp mechanism converting the rotational movements of the pivoting shaft into translational movements of the piston and comprising a rotary plate that rotates as one with the pivoting shaft, a moving plate and balls housed in ramp ribs made in the facing faces of the two plates, characterized in that the said moving plate consists of the piston.

The brake cylinder according to the invention is advantageous in that is comprises a ball-ramp mechanism consisting partially of the piston, which means that the rotational movement of the pivoting shaft is converted into a translational movement of the piston directly on the piston without the insertion of any additional parts.

The saving on the total number of parts of the cylinder results from the elimination of one of the plates of the ball-ramp mechanism, and from the elimination of the intermediate parts between the moving plate of the ball-ramp system and the piston.

Furthermore, using the piston as the moving plate makes it possible to take advantage of the fact that the piston is able to move in translation but is fixed in terms of rotation because it is secured to the friction lining carrier plate. This mobility characteristic of the piston, which already exists in any brake cylinder of conventional configuration, makes the use of the piston as a moving plate particularly beneficial because no additional means is required to render the piston, by way of moving plate, free in translation but fixed in terms of rotation.

As a result, the brake cylinder according to the invention saves not only on the moving plate but also on the structural means, such as binding screws, usually essential for preventing the moving plate from rotating.

In one particular embodiment of the invention, the brake cylinder comprises a screw-nut assembly of which the screw is secured to the rotating plate of the ball-ramp.

Advantageously, the nut of this assembly comprises a disengageable means of immobilizing it in terms of rotation, which blocks the said nut during a high-pressure hydraulic control of the brake.

Such an immobilizing means may consist of a conical clutch, for example formed of a collar provided on the nut, a chamfered edge of which processes, under the action of a return means, against a fixed frustoconical seat.

According to one particular characteristic, the screw secured to the moving plate is connected to the piston by an elastic means.

Should the piston translate during a braking action, this elastic means, which may be a helical spring, deforms elastically and exerts on the screw a force that tends to cause it to follow the piston.

Another subject of the present invention is a motor vehicle brake comprising a brace cylinder as described hereinabove.

Figure 2:
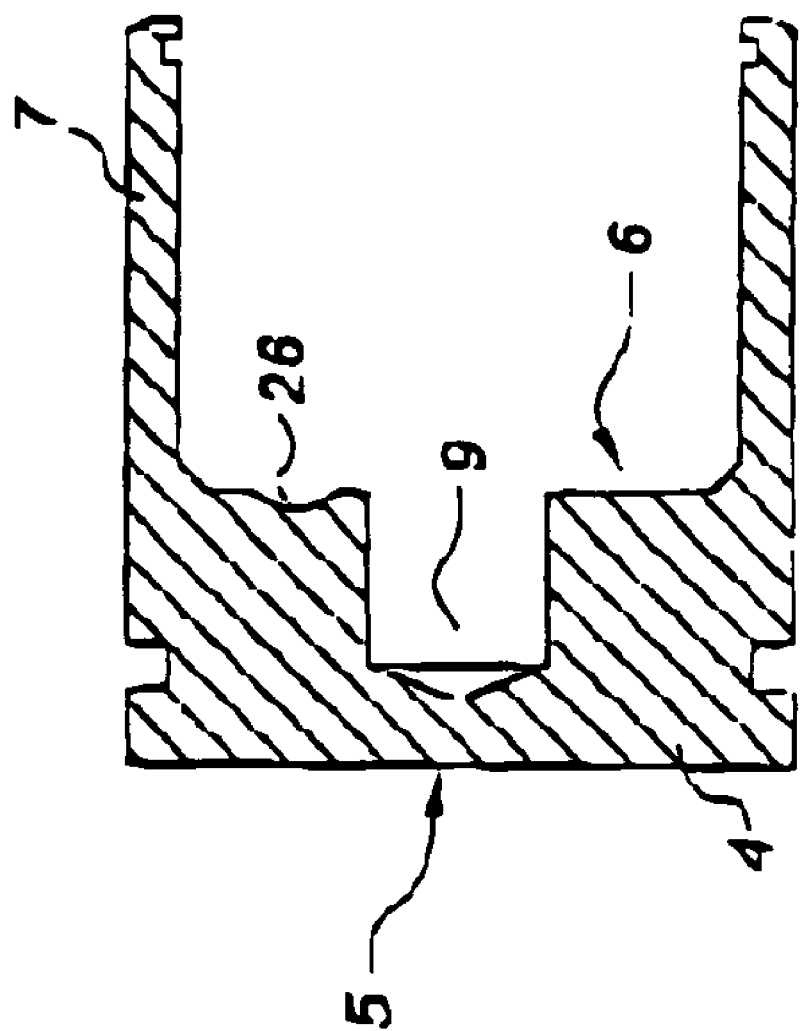

To make the invention easier to understand, one embodiment thereof, given by way of non-limiting example, will now be described with the aid of the attached drawings which comprise:

FIG. 1 which is a view in axial section of a brake cylinder,

FIG. 2 which is a view in axial section of the piston of the cylinder of FIG. 1.

FIG. 1 depicts, in section, a brake cylinder according to the invention.

This cylinder comprises a body 1 of roughly cylindrical shape, equipped with a first end partially closed off by a wall 2 leaving only an axial passage 3 and with a second end that is open over its entire interior section. This interior section remains constant from the said second end of the body as far as approximately half way along its length, delimiting a cylindrical chamber in which a piston 4 of corresponding external shape slides.

The piston 4 comprises, at the opposite end to its outer face 5 that bears against a brake pad carrier plate, on the one hand, an interior wall consisting of a virtually flat end well 6 and, on the other hand, a peripheral skirt 7 which defines the cylindrical exterior shape of the piston and delimits a space inside the said piston, open towards the first end of the body. A seal 8, housed in an internal annular groove of the cylindrical chamber of the body accommodating the piston seals between the piston and the said cylindrical chamber.

The piston 4, once secured to the carrier plate, can no longer rotate about its longitudinal axis (which is also that of the body 1) because the said carrier plate is immobilized in terms of rotation.

An axial bore 9 is made in the piston, from its end wall 6 towards the carrier plate. This bore 9 frees up the space needed for the movement of the splined end 10 of a shaft 11 which extends axially into the body as far as its first end, through the axial passage 3 of which it passes. The end 12 of the shaft 11 projecting from the body is secured directly to a parking brake actuating lever 14.

The shaft 11 comprises a collar 13, situated near the wall 2 and constituting a shoulder limiting the axial movement of the shaft towards the passage 3.

The collar 13 is housed in a nut 15 and an end part 15a of which occupies, give or take the clearances, the annular space separating the said collar 12 from the part of the body 1 in line with it.

Outside of this end part, the nut is internally tapped, the threads 15b of this tapping being visible in FIG. 1.

The nut 15 is held axially against the wall 2 of the body by a cup spring 16 set into the body. This cup spring 16 allows the nut 15 to turn, provided the friction generated by this rotational movement is overcome.

Projecting from its external lateral wall, the nut 15 has a collar 17, of which the edge 18 on the opposite side to the piston 4 is chamfered into a cone frustum, while the part 19 of the internal lateral wall of the body facing this edge 18 forms a frustoconical scat, with roughly the same cone angle. The chamfered edge 18 and the frustoconical seat 19 form a conical clutch. The end of the nut near the wall 2 of the body remains set back from this wall when the chamfered edge 18 of the collar bears against the frustoconical seat 19 of the body so that the nut 15 is able to be coupled to the body 4 in order to rotate as one therewith when subjected to a force directed towards the wall 2.

The nut 15, the shaft 11 and the body 3 are all coaxial, and this is why it is preferable for sufficient clearance to be left between two of them, for example between the collar 12 of the shaft and the nut 15.

Scale 20, 21 are housed in annular grooves between the collar 12 and the nut 15, on the one hand, and between the nut 15 and the body 1, on the other, so that the interior cavity of the body is sealed, being delimited by the end wall 6 and the skirt 7 of the piston, the internal lateral wall of the body, the nut 15 and the collar 12 of the shaft 10.

A threaded bushing 22 or screw, the threads 22a of which coincide with those 15b of the tapped thread of the nut 15, is screwed into the latter permanently around the shaft 11. The said bushing is extended towards the piston beyond the nut in the form of a flat annular base 23 the periphery of which lies close to the piston skirt 7, which is equipped with internal splines 24 which engage in axial cut-outs 25 in the blades 23, thus securing the threaded bushing to the piston in terms of rotation, that is say preventing it from turning.

The base 23 is also subjected to the pressure of a helical spring 26 compressed between the said base 23 and a circlip 27 constituting a stop secured to the skirt.

Finally, between the base 23 and the end wall 6 of the piston there is a circular plate 28 separated from the base 23 by an antifriction washer 29. The plate 28 rotates as one with the shaft 11 by virtue of a grooved sleeve 30, of one piece with the said plate, engaged around the splined end 10 of the said shaft.

The face of the plate that faces towards the piston is equipped with three ball-ramps 31, well known in the field of the invention but usually situated at a different location in the brake mechanism.

Facing these ramps 31, the end wall 6 of the piston also has three ball-ramps 32 of opposite slope, a ball 33 being trapped in each pair of ramps resulting from a ramp of the piston lying apposite a ramp of the plate.

The assembly formed by the end wall 6 of the piston, the balls 33 and the plate 28 constitutes a ball-ramp system the function of which is to move the plate away from the piston when these two items pivot one with respect to the other, because of the balls running along their ramps.

In the example depicted, the piston is made of steel, a material which is hard enough to withstand the rolling of the balls along their ramp. With a piston made of a softer alloy, such as an aluminium alloy, or alternatively of a phenolic resin, a hard part attached to the piston will advantageously be provided to form its face facing the plate, or at the very least to form the ramps that accommodate the balls. Surface treatment of the piston may also be envisaged.

The way in which the brake mechanism works will now be described.

This mechanism can be actuated on the one hand hydraulically, which corresponds to running control triggered by the vehicle brake pedal and, on the other hand, mechanically, which corresponds to parking control triggered by the parking brake lever or pedal.

With hydraulic actuation, a pressurized hydraulic fluid is injected into the interior cavity of the body, the delineation of which has already been detailed.

The pressure within this cavity has the particular effect of driving the piston 4 towards the outside of the body, thus performing braking by moving the carrier plate 5 towards the brake disc.

The pressure also has the effect of pressing the collar 12 of the shaft against the opposite wall 2 to the piston.

The movement of the piston tends to compress the helical spring 26 further, and therefore tends to increase the axial force exerted by this spring on the threaded bushing 22. In consequence, the latter in turn exerts, on the nut 15 and via the threads 22a and 15b, an axial force directed towards the piston and a rotational torque aimed at causing the nut to turn in order to unscrew the said bushing from the nut.

The latter is also subjected by the pressurized fluid to a force which tends to press its chamfered edge 18 against the frustoconical sent 19 of the body. This force is the mathematical product of the pressure of the fluid and the sealing cylindrical cross section of the nut, that is to say its cross section in its part not subjected to the pressure, which lies in line with the collar 12.

The nut is therefore subjected to two opposing forces, one directed towards the piston 4 and transmitted by the spring 26, and the other directed towards the wall 2 and resulting directly from the action of the pressurized fluid of the piston.

For fluid pressures below a threshold pressure defined as being the pressure that exactly compensates for the action of the spring 26, the conical clutch releases the nut. The latter can therefore turn to allow the bushing to follow the piston. The brake is adjusted.

For fluid pressures higher than this threshold pressure, the action of the spring remains too low to overcame the action of the fluid on the nut and the conical clutch remains engaged. The nut cannot turn and brake adjustment is inhibited.

Thus, adjustment is interrupted before the brake is completely applied, thus avoiding the brake becoming jammed in this position once the hydraulic fluid pressure is released.

In mechanical actuation, the control lever 14 causes the shaft 11 to rotate and this shaft transmits the torque to the plate 28 via the grooved sleeve 30.

The plate starts to turn with respect to the piston which is prevented from running.

The ball-ramps thus fulfil their function of separating the plate from the piston.

The plate presses, via the antifriction washer 29, on the threaded bushing 22 which is immobilized in terms of rotation with respect to the piston by virtue of the splines 24.

The axial force transmitted by the bushing to the nut presses the chamfered edge 18 against the seat 19 and prevents the nut from turning. The bushing can therefore not be screwed into the nut and provides the reaction allowing the plate to push the piston towards the outside of the body.

It can be seen that the operation of the brake cylinder described above is the same as that of a conventional brake cylinder.

By contrast, in its concrete embodiment, it comprises only seventeen parts, as compared with the twenty-one parts needed to form an equivalent brake cylinder of conventional structure.

Another advantage, measurable in concrete terms, of the brake cylinder according to the invention is its reduction in length, which reduction may be by as much as seventeen millimeters.

We claim:

1. A mechanically and hydraulically actuated brake cylinder for a motor vehicle having a body (1) with a bore therein for receiving an axially movable piston (4) to define a chamber therein and a pivoting shaft (11) that has a part thereof accessible from outside the body (1), said chamber receiving pressurized fluid to move said piston and hydraulically actuate a brake, said pivoting shaft (11) receiving a rotational torque for mechanicaly actuating a brake through a ball-ramp mechanism that converts the rotational torque of the pivoting shaft into translational movements of the piston (4) and comprising a rotary plate (28) that rotates as one with the pivoting shaft (11), a moving plate and balls (33) housed between a first ramp rib (31) located on a face on said rotary plate (28) and a second ramp rib (32) located on a face of the moving plate, characterized in that said moving plate is said piston, said brake cylinder being further characterized by a screw-nut assembly having a screw (22) that is secured to the rotating plate (28) and a nut (15) that is located in bore of the body and means (18, 19) that blocks the rotation of said nut (15) on receipt of a high-pressure hydraulic fluid by the chamber to hydraulically actuate the brake.

2. The brake cylinder according to claim 1, characterized in that said means (18, 19) is a conical clutch formed by a chamfered edge (18) on a collar on nut (15) that is urged into engagement with a fixed frustoconical seat (19) formed in the body (1) by a return means (16).

3. The brake cylinder according to claim 2, characterized in that the screw (22) is secured to the piston (4) by an elastic means (26).

* * * * *